United States Patent [19]
Gardner

[11] Patent Number: 5,584,194
[45] Date of Patent: Dec. 17, 1996

[54] METHOD AND APPARATUS FOR PRODUCING LIQUID NITROGEN

[76] Inventor: Thomas W. Gardner, 737 Damien Way, Mississauga, Ontario, Canada, L5C 3C3

[21] Appl. No.: 551,041

[22] Filed: Oct. 31, 1995

[51] Int. Cl.[6] ........................................ F25J 1/00
[52] U.S. Cl. .................. 62/615; 62/640; 95/52; 95/54
[58] Field of Search .............................. 95/52, 54; 96/10; 62/615, 640

[56] References Cited

U.S. PATENT DOCUMENTS

| | | | |
|---|---|---|---|
| 3,452,541 | 7/1969 | Builder | 62/615 |
| 4,595,405 | 6/1986 | Agrawal et al. | 62/18 |
| 4,841,732 | 6/1989 | Sarcia | 62/36 |
| 4,874,413 | 10/1989 | Thonnelier | 62/640 |
| 5,388,413 | 2/1995 | Major et al. | 62/640 |

FOREIGN PATENT DOCUMENTS

| | | |
|---|---|---|
| 2042365 | 9/1980 | United Kingdom . |
| 2160439 | 12/1985 | United Kingdom . |
| 2170894 | 8/1986 | United Kingdom . |

OTHER PUBLICATIONS

Promotional publication "Generon Supplying Membrane for Industry".

Primary Examiner—Ronald C. Capossela
Attorney, Agent, or Firm—Donald E. Hewson

[57] ABSTRACT

A method and apparatus for producing liquid nitrogen from air comprising a gaseous mixture of about 78% by volume of nitrogen, about 21% by volume of oxygen, less than 1.0% by volume of argon, and small amounts of carbon dioxide, water vapour, and other trace elements and compounds comprise an extractor that extracts portions of the oxygen, carbon dioxide, and water vapour so as to produce a nitrogen-rich gaseous mixture comprising about 90% to about 99% by volume of nitrogen, about 10% to about 1% by volume of oxygen, and no more than trace amounts of carbon dioxide, water vapour, and other elements and compounds. A nitrogen recycle compressor compresses the nitrogen-rich gaseous mixture to a specified pressure. A gas expander expands and thereby cools the compressed nitrogen-rich gaseous mixture to a lower specified pressure which is slightly above atmospheric pressure, thereby cooling the nitrogen-rich gaseous mixture, which is fed into a heat exchanger, which cools a higher pressure nitrogen-rich gaseous mixture flowing in a separate pass of the heat exchanger, until at least a portion of the higher pressure nitrogen-rich gaseous mixture condenses to liquid state. A liquid/gas separator separates the liquid nitrogen from the nitrogen-rich gaseous mixture, which liquid nitrogen is extracted from the apparatus, through an outlet, for subsequent storage or use.

20 Claims, 2 Drawing Sheets

METHOD AND APPARATUS FOR PRODUCING LIQUID NITROGEN

FIELD OF THE INVENTION

This invention relates to the production of liquid nitrogen from ambient air, and a method and apparatus for producing the same. Such liquid nitrogen would contain reduced portions of oxygen and other elements as compared to ambient air.

BACKGROUND OF THE INVENTION

Nitrogen is used both in its gaseous state and its liquid state for many purposes in various industries. Gaseous nitrogen is commonly used for ambient temperature preservation of fruits and vegetables, the fracturing and stimulation of oil and gas wells for enhanced recovery purposes, the blanketing, purging, and drying of vessels and pipelines, and so on. Liquid nitrogen is used for purposes such as for the flash freezing of various foods, including chicken, beef, and coffee, the shrink fitting of metal pans with close and exacting tolerances, cryogenic grinding of metals, freezing of used automotive tires for grinding and recycling, freezing of earth for enhanced excavation purposes, cooling of cement for quicker curing, and so on. Oxygen, in its gaseous state, is used for medical purposes, such as in hospitals, and is used for commercial purposes, such as aerating water at fish farms for enhanced fish growth, in the fabrication of steel, in welding operations, the primary treatment of sludge in sewage treatment plants, and so on.

Various methods exist for producing nitrogen gas and oxygen gas, which gases can subsequently be cooled to their respective liquid states. Such methods will be discussed in greater detail subsequently. Each of these methods involves the use of ambient air as a source for the nitrogen gas and the oxygen gas, and accordingly, that source is a gaseous air mixture comprising about 78% nitrogen, 21% oxygen, less than 1% argon, 300 to 500 parts per million carbon dioxide and other gaseous elements and compounds in trace amounts.

One method of producing the nitrogen gas and oxygen gas involves a cryogenic process wherein compressed air, at a pressure in a range from about 70 psig to about 140 psig, is used. The compressed air is cooled in a water-to-air heat exchanger, and is then passed through an ambient temperature adsorbent, and/or a varying cryogenic temperature heat exchanger, for purposes of purification by way of carbon dioxide and water vapour removal. The purified gaseous mixture is then passed through another cryogenic temperature heat exchanger, a sub-cooler, and then through expansion turbines and/or expansion valves. It is then received into a rectification column, or rectification columns, in both liquid and gaseous forms, which distillation columns contain a number distillation trays for the purpose of separating the nitrogen, oxygen, and argon, one from the other, both in gaseous and liquid forms, where appropriate. Nitrogen, oxygen, and argon are subsequently drawn off the rectification column at precise points in order to ensure maximum contained purity of the particular gas or liquid being drawn off. The oxygen gas produced in this manner is about 95% to about 99.5% pure and is marketed in this form for virtually any suitable application. The nitrogen gas or liquid produced in this manner is 99.999% pure and can be used for virtually any suitable application.

While nitrogen gas or liquid nitrogen having a purity of 99.999% is necessary for some applications, such a high purity it is not necessary for all applications. It is known that 90% to about 99% pure nitrogen gas is quite suitable for some applications. For instance, oil refineries use 95% to about 97% pure nitrogen gas for drying and purging purposes, such as drying pipelines until they are substantially dry, and then use a smaller amount of 99.999% pure nitrogen gas to finish the drying and purging process. The advantage in this procedure is that the largest quantity of nitrogen, namely the 95% to about 97% pure nitrogen, is less expensive to produce than the 99.999% pure nitrogen. The 95% to 97% pure nitrogen gas that is used by refineries in the above described mariner, is produced by removing oxygen from air with natural gas or oil combustion methods. However, the 95% to 97% nitrogen gas could also contain up to about 2% to 3% oxygen, respectively, as well as other impurities, specifically water vapour and carbon dioxide, as is further discussed below. Nitrogen gas having a purity of 95% to 97% may also be produced in other manners including by membrane separation, or by pressure swing adsorption (PSA). Those other methods of nitrogen gas production will now be discussed in greater detail.

Membrane separation is one process for nitrogen gas production. In this non-cryogenic ambient temperature process, air is fed through an elongate cylinder having a hollow central bore, and having an amount of membrane fibre filtering material around the hollow central bore. The membrane fibre filtering material is made from various monomers and polymers, and exhibits the characteristic of diffusing water vapour, oxygen, and nitrogen, at different rates. Accordingly, most of the water vapour, and a substantial amount of the oxygen, filter through the membrane, while very little of the nitrogen filters through the membrane. The nitrogen escapes the cylinder through an opening at the far end thereof. The nitrogen gas that escapes is 90% to 99% pure, with therefore about 10% to 1% oxygen and minute amounts—measured in parts per million (p.p.m.)—of carbon dioxide, and $H_2O$ as water vapour.

Pressure swing adsorption technology was commercialized in the mid-1970's for the ambient temperature non-cryogenic production of nitrogen from a compressed air feed stream. The critical component of the pressure swing adsorption process is a carbon molecular sieve. This adsorbent exhibits a significantly higher time dependent loading factor for oxygen than nitrogen, even though the equilibrium loading for both gases at pressures up to 145 psig is almost the same. Carbon molecular sieves have a pore structure smaller than 10 Angstroms. The inner surface of the sieve will be accessible to gases with the smallest molecular size. The carbon molecular sieve material has many micropores in the size range of the oxygen molecule, thus allowing oxygen molecules to easily enter the sieve. The slightly larger nitrogen molecules take more time to penetrate the micropores and be absorbed.

In a typical pressure swing adsorption nitrogen plant, compressed air is cooled to ambient temperature and flows into an air buffer tank which acts as an air reservoir during molecular sieve bed tower repressurization and also as an additional water removal point in the system. From the air tank, the air flows through one of two, alternating on-line pressure swing adsorption towers where it is dried and separated. Gas separation takes place as the air passes through the carbon molecular sieve. Product gas exits the top of the tower and is removed From the unit into the user's nitrogen supply system. While the onstream tower is producing nitrogen, the other is at atmospheric pressure and is regenerated by heating and exhausting the desorbed gases to the atmosphere. The tower switching process entails closing the feed and delivery valves, pressure equalization between the two towers, repressurization of the bottom or the offstream tower with air from the air buffer tank and the top of the offstream tower with nitrogen product from the downstream receiver tank, and depressurization of the tower going offstream. Adherence to purity specification is maintained by an oxygen analyzer controlling dump/delivery valves in the product nitrogen line.

Productivity (volume of nitrogen/volume of carbon molecular sieve) of a pressure swing adsorption plant is dependent on nitrogen purity. A given size pressure swing adsorption unit can produce over twice as much nitrogen at 95% purity than at 99.5% with only a 25% to 35% increase in feed air requirement.

As noted above, it is often preferable, where permissible as may be determined according to other criteria, to use nitrogen gas with a purity of less than 99.999% where possible since it is less expensive than 99.999% pure nitrogen gas produced by rectification.

Nitrogen gas having a purity of between 90% and about 99%, and which therefore contains about 10% to about 1% oxygen, respectively, can be converted into its liquid state, for various uses. The specific purposes of the present invention deal with the production of liquid nitrogen from nitrogen gas having a purity of between 90% and about 99%.

It is well known to produce 99.999% pure liquid nitrogen by means of a rectification column, as discussed above, and to use the 99.999% pure liquid nitrogen for various applications.

It is believed that it would be acceptable to use 90% to 99% pure liquid nitrogen for many applications where 99.999% pure liquid nitrogen is now used; however, it is not known to do so for the following reason: The 95% to 97% pure nitrogen gas produced by natural gas or oil combustion methods generally has in it certain impurities, including particularly $H_2O$ and carbon dioxide. These impurities are present in sufficient amounts to make it difficult and expensive to liquify the 95% to 97% pure nitrogen gas. Moreover, it is prohibitively expensive to remove these impurities prior to liquification. Accordingly, it is not known to use 95% to 97% pure nitrogen gas produced by natural gas or oil combustion methods to produce liquid nitrogen, especially because of the presence of $H_2O$ and $CO_2$ impurities.

It is also not known to use 90% to 99% pure nitrogen gas produced by the use of membrane fibre filtering materials, or PSA, as discussed above, to produce liquid nitrogen.

Therefore, it is not known to use 90% to 99% pure nitrogen gas, whether it is obtained by combustion, PSA, or from membrane separation techniques, in order to produce liquid nitrogen.

What the present invention provides is a means, both by way of methods and apparatus, for producing liquid nitrogen from 90% to 99% pure nitrogen gas that has been derived from ambient air using membrane separation and/or molecular sieve separation techniques.

DESCRIPTION OF THE PRIOR ART

U.S. Pat. No. 4,595,405 to AGRAWAL et al discloses a process for the generation of gaseous and/or liquid nitrogen wherein a cryogenic separation unit and a membrane separation unit are integrated one with the other. A gas stream comprises nitrogen and oxygen, and typically is air. The process comprises treating the feed gas stream in a cryogenic processing unit, and subsequently withdrawing at least a portion of the treated gas stream therefrom and introducing the stream into a membrane separation unit. The cryogenic processing unit may provide any suitable cryogenic cycle. In one example, the cryogenic processing unit comprises a heat exchanger and a distillation column. In the membrane separation unit, the gas stream is separated to form a nitrogen-rich stream and an oxygen rich stream. The nitrogen-rich stream is returned to the cryogenic separation unit for further treatment and separation to produce a purified liquid and/or gaseous nitrogen-rich product stream. Preferably, the feed gas stream is initially passed through a clean up unit, such as a molecular sieve bed, to remove impurities prior to entering the cryogenic processing unit. The nitrogen-rich product stream generally has a purity of greater than 99.7%. It follows from the teachings of this patent that it is necessary to have nitrogen gas that is at least 99.7% pure and that a distillation column is necessary in order to produce liquid nitrogen.

U.S. Pat. No. 4,841,732 to SARCIA discloses a system and apparatus for producing liquid nitrogen from ambient air. The ambient air is supplied under pressure to a membrane separator, where most of the gases other than nitrogen permeate the membranes, and are vented to the atmosphere leaving almost pure—namely 99% pure—nitrogen gas. The nitrogen gas is then supplied to a Dewar container in the neck of which is mounted the cylindrical cold head of a miniature cryogenic refrigerator. The temperature of the cold head is maintained below the liquification temperature of nitrogen so that the nitrogen gas is liquified as it passes over the cold head in heat exchanging relation. Essentially, as disclosed in this patent, this system is a small laboratory type experimental system capable of producing only small amounts of liquid nitrogen.

United Kingdom patent application No. 2,170,894 to GARRETT et al discloses a process and apparatus for separating nitrogen from air, by first producing nitrogen-enriched air containing nitrogen in a portion of at least 90% by volume, and preferably 97% by volume. The temperature of the nitrogen-enriched air is reduced to a value at which the nitrogen-enriched air liquifies, at least in part. The nitrogen-enriched air remains in the apparatus where it is then introduced into a rectification column with reflux and reboil facility, in order to rectify the nitrogen-enriched air, thereby producing relatively pure nitrogen, with not more than ten parts per million of oxygen. It follows from the teachings of this patent, that a rectification column is necessary to produce liquid nitrogen.

SUMMARY OF THE INVENTION

In accordance with one aspect of the present invention, there is provided a method of producing liquid nitrogen, which particularly comprises the following steps:

First, the invention contemplates the use of ambient air comprising a gaseous mixture of about 78% by volume of nitrogen, about 21% by volume of oxygen, less than 1.0% by volume of argon, and small amounts of carbon dioxide, water vapour, and other trace elements and compounds. Portions of the oxygen, carbon dioxide, and water vapour are extracted from the gaseous air mixture, either by membrane or molecular sieve processes, so as to produce a nitrogen-rich gaseous mixture comprising from about 90% to about 99% by volume of nitrogen, from about 10% to about 1% by volume of oxygen, and no more than trace amounts, as typically measured in parts per million (p.p.m.) of carbon dioxide, water vapour, and other elements and compounds. Then, the nitrogen-rich gaseous mixture is compressed to a first specified pressure which is much higher than atmospheric pressure. Thereafter, the compressed nitrogen-rich gaseous mixture is expanded to a second lower specified pressure which is slightly above atmospheric pressure, thereby cooling said gaseous nitrogen mixture. Then, the cold low pressure nitrogen-rich gaseous mixture is fed into a three pass brazed aluminum finned heat exchanger, which heat exchanger further removes heat from a cooled nitrogen gaseous mixture, at a higher pressure, until at least a portion of the nitrogen in the high pressure gaseous nitrogen pass of the heat exchanger, condenses to its liquid state. The liquid nitrogen is then separated from the remaining nitrogen gas, and extracted for subsequent storage or use.

In accordance with another aspect of the present invention, there is provided an apparatus for producing liquid nitrogen from air comprising a gaseous mixture of about 78% by volume of nitrogen, about 21% by volume of oxygen, less than 1.0% by volume of argon, and small amounts of carbon dioxide, water vapour, and other trace elements and compounds. The apparatus may comprise an extractor, namely a membrane separator and/or a molecular sieve, having an input of the gaseous air mixture and producing an output of a nitrogen-rich gaseous mixture comprising about 90% to about 99% by volume of nitrogen, about 10% to about 1% by volume of oxygen, and no more than trace amounts, as measured in p.p.m., of carbon dioxide, water vapour, and other elements and compounds. A nitrogen compressor is connected in fluid communication to the extractor to receive the nitrogen-rich gaseous mixture and to compress the nitrogen-rich gaseous mixture to a first specified pressure above atmospheric pressure. A gas expander is connected in fluid communication to the nitrogen compressor to receive the compressed nitrogen-rich gaseous mixture therefrom, and to expand and cool the compressed nitrogen-rich gaseous mixture to a second lower specified pressure, which is slightly above atmospheric pressure. A heat exchanger is connected in fluid communication to the gas expander to receive the cold low pressure nitrogen-rich gaseous mixture therefrom and to further cool the high pressure nitrogen-rich gaseous mixture in a second pass of the three pass heat exchanger, until at least a portion of the low pressure nitrogen-rich gaseous mixture condenses to liquid state. A liquid/gas separator is connected in fluid communication to the heat exchanger to receive liquid nitrogen and the nitrogen-rich gaseous mixture therefrom and to separate the liquid nitrogen from the nitrogen-rich gaseous mixture. An outlet is connected in fluid communication to the liquid/gas separator to extract the liquid nitrogen from the liquid/gas separator for subsequent storage or use.

BRIEF DESCRIPTION OF THE DRAWINGS

Embodiments of this invention will now be described by way of example in association with the accompanying drawings in which.

DETAILED DESCRIPTION OF THE PREFERRED EMBODIMENTS

Figure 1:
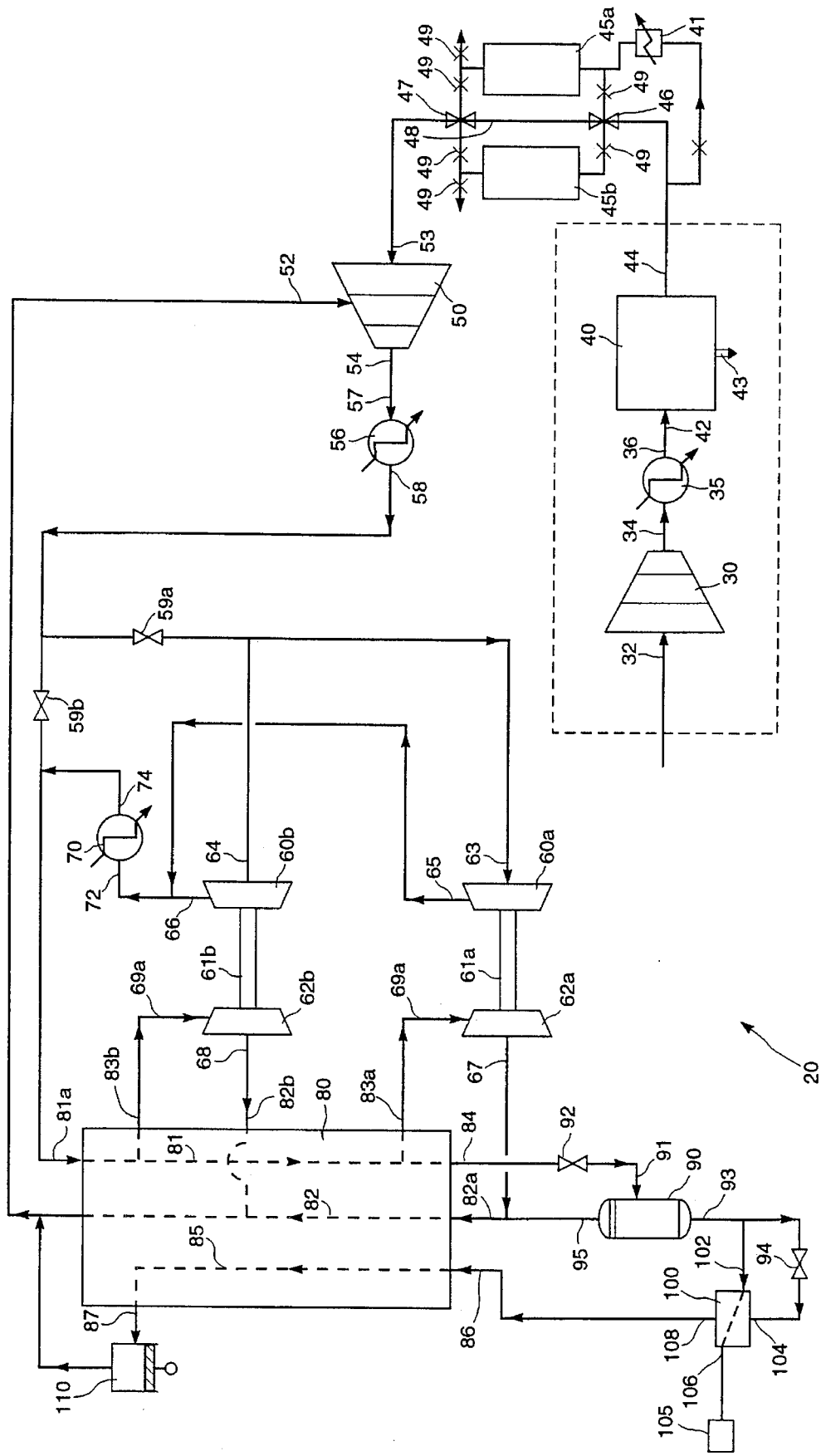
FIG. 1 is a simplified process flow schematic view of the preferred embodiment of the apparatus of the present invention.

Reference will now be made to FIG. 1, which shows the preferred embodiment of the apparatus 20 of the present invention, in simplified process flow schematic form. The apparatus 20 produces liquid nitrogen from air comprising a gaseous mixture of about 78% by volume of nitrogen, about 21% by volume of oxygen, less than 1% by volume of argon, and small amounts of carbon dioxide, water vapour, and other trace elements and compounds. Typically, ambient air is used as the input for the apparatus 20 of the present invention, in order to produce liquid nitrogen.

The apparatus 20 comprises an extractor, that in the preferred embodiment comprises an initial compressor 30 and a membrane separator 40. Alternatively, a molecular sieve bed separator can be used in place of the membrane separator 40. The initial compressor 30 has an input 32 of the gaseous air mixture described above—namely ambient air. The initial compressor 30 compresses the ambient air to a third specified pressure above atmospheric pressure, of typically from about 140 psig to about 190 psig, as determined through routine engineering calculation, and accordingly produces at its output 34 a compressed gaseous air mixture at the third specified pressure.

A first non-contact, water-to-air aftercooler 35 is connected in fluid communication to the output 34 of the initial air compressor 30. The first aftercooler 35 cools the compressed air and removes free moisture from the compressed air. The membrane separator 40 is connected in fluid communication to the first aftercooler 35 and receives thereinto at its input 42, the cooled compressed gaseous air mixture from the output 36 of the first aftercooler 35. The membrane separator 40 uses conventional membrane technology to extract portions of the oxygen, carbon dioxide, and water vapour from the compressed gaseous air mixture. Such extraction by the membrane separator 40 of the oxygen, carbon dioxide, and water vapour from the compressed gaseous air mixture produces at its output 44 a nitrogen-rich gaseous mixture comprising about 90% to about 99% by volume of nitrogen, about 10% to about 1% by volume of oxygen, and no more than trace amounts of carbon dioxide, water vapour, and other elements and compounds. The oxygen, carbon dioxide, and water vapour are expelled to the atmosphere through vent 43.

As required, the air is the fed into activated alumina traps 45a and 45b, or, alternatively, molecular sieve bed traps (not shown), which are connected in parallel one with the other so as to function alternatively in tandem, and are optionally included in series with the output 44 of the membrane separator 40 by means of co-operating switching valve groups 49. The valves 46 and 47 may be used to select by-pass 48 if the activated alumina traps 45a and 45b (or alternatively the molecular sieve bed traps) are not required. The activated alumina traps 45a and 45b (or alternatively the molecular sieve bed traps) filter out the minute amounts of oxygen, carbon dioxide, and water vapour that might pass through the membrane separator 40. Moreover, a regeneration heater 41 is used to heat the activated alumina traps 45a and 45b (or alternatively the molecular sieve bed traps) in an alternating manner—that is to say, the trap which is not in use is heated, while the other trap is being used on-line, in order to regenerate the trap which is not on-line.

A nitrogen recycle compressor 50 is connected in fluid communication to the membrane separator 40 or the activated alumina trap 45a or activated alumina trap 45b, as selected by the co-operating valves 46 and 47, to receive thereinto at its first input 52 the nitrogen-rich gaseous mixture from the output 44 of the membrane separator 40. The recycle nitrogen compressor 50 compresses the nitrogen-rich gaseous mixture to a specified pressure from about 120 psig to 170 psig to about 450 psig, as determined through routine engineering calculations, thereby increasing the energy content of the nitrogen-rich gaseous mixture. A second non-contact water-to nitrogen after-cooler 56 is connected in fluid communication at its input 57 to the output 54 of the recycle nitrogen compressor 50. The compressed nitrogen-rich gaseous mixture is fed into the second after-cooler 56 where a significant amount of the heat energy of the compressed nitrogen-rich gaseous mixture is given off so as to cool the nitrogen-rich gaseous mixture.

The cooled, compressed nitrogen-rich gaseous mixture is then fed from the output 58 of the second after-cooler 56, either through control valve 59b during start-up, or during ongoing operation through control valve 59a, to first nitrogen booster compressor 60a through input 63 and second nitrogen booster compressor 60b through input 64 and is compressed further, to a first specified pressure of approximately 635 psig, by first and second nitrogen booster compressors 60a and 60b. The compressed nitrogen gas, which is now at a relatively high temperature due to compression by the first and second nitrogen booster compressors 60a and 60b, exits the first nitrogen booster compressor 60a through output 65 and exits the second nitrogen booster compressor 60b through output 66. The outputs 65 and 66 are connected in fluid communication to the input 72 of a third non-contact water-to nitrogen aftercooler 70. The third aftercooler 70 cools the relatively high temperature, high pressure nitrogen gas and feeds the cooled nitrogen gas from its output 74 to input 81a of high pressure gaseous nitrogen pass 81 of heat exchanger 80 for subsequent cooling and liquification. Portions of the nitrogen gas in high pressure gaseous nitrogen pass 81 are taken off at output 83b to input 69b of expansion turbine 62b and at output 83a to input 69a of expansion turbine 62a. The expansion turbine 62a is connected in driven relation to the first nitrogen booster compressor 60 by means of a drive shaft 61a. Similarly, the second expansion turbine 62b is connected in driven relation to the second nitrogen booster compressor 60a by means of a second drive shaft 61b. The first expansion turbine 62a and the second expansion turbine 62b expand the compressed nitrogen gas, fed from the third aftercooler 70, to a second lower specified gauge pressure, which is above atmospheric pressure, producing cooled gas which is fed from outputs 67a and 67b, respectively, into cooling pass 82 of the heat exchanger 80, at input 82a and input 82b.

The nitrogen gas flowing in the high pressure gaseous nitrogen pass 81, which is at a much higher pressure than the nitrogen-rich gas flowing in the cooling pass 82, of the heat exchanger 80, is cooled, thereby further giving off sufficient heat to liquify the nitrogen-rich gaseous mixture in the high pressure gaseous nitrogen pass 81, by the cooled nitrogen gaseous mixture in the cooling pass 82. The nitrogen gas flowing in the high pressure gaseous nitrogen pass 81, exits the heat exchanger 80 in the form of a homogeneous liquid nitrogen/gaseous nitrogen mixture, at output 84. The homogeneous liquid nitrogen/gaseous nitrogen mixture then passes through valve 92 and enters a liquid/gas separator 90 through input 91.

The liquid/gas separator 90 separates liquid nitrogen and the nitrogen-rich gaseous mixture one from the other. The remaining nitrogen-rich gaseous mixture, which is only slightly above liquification temperature, is fed back from output 95 of liquid/gas separator 90 through the heat exchanger 80 at input 82a into cooling pass 82b. This gaseous nitrogen-rich mixture joins the expanded low pressure nitrogen-rich gaseous mixture, which is expelled from the main outputs 67 and 68 of the first gas expansion turbine 61 a and the second gas expansion turbine 61b, into the cooling pass 82, and aids in the cooling of the nitrogen-rich gas, which is flowing in the opposite direction of cooling pass 82 in the adjacent high pressure gaseous nitrogen pass 81. The nitrogen-rich gas in the adjacent cooling pass 82 is fed back from output 88 of the heat exchanger 80 to the second input 52 of the recycle nitrogen compressor 50 for another pass through the cooling portions of the apparatus 20 of the present invention.

A sub-cooler heat exchanger 100 is connected at its first input 102 in fluid communication with the output 93 of the liquid/gas separator 90, and at its second input 104 in fluid communication with the output 93 of the liquid/gas separator 90 through control valve 94. The liquid nitrogen that is separated by the liquid/gas separator 90 is fed into the sub-cooler heat exchanger 100 whereat the received liquid nitrogen, which is essentially at its boiling point, is cooled to a temperature substantially below its boiling point, perhaps twenty to thirty degrees Fahrenheit below its boiling point, so as to be sub-cooled and thereby substantially stabilized to a more stable state than liquid nitrogen at its boiling point. An outlet, typically in the form of a releasable coupling 105, is connected in fluid communication to the first output 106 of the sub-cooler heat exchanger 100 to permit extraction of the liquid nitrogen from the apparatus 20 of the present invention, for subsequent storage or use.

Nitrogen gas that boils off in the sub-cooler heat exchanger 100 exits the sub-cooler heat exchanger 100 through second output 108 and is returned into cooling pass 85 of heat exchanger 80 through input 86, where the nearly liquified nitrogen gas is used to further absorb heat from the nitrogen-rich gas in the adjacent high pressure gaseous nitrogen pass 81. This portion of the nitrogen gas then exits the heat exchanger 80 through output 87 at a temperature close to ambient temperature, and is fed through a nitrogen booster compressor 110 and is returned, along with the nitrogen gas from the liquid/gas separator 90, to the recycle nitrogen compressor 50 for another recycled pass through the cooling portions of the apparatus 20 of the present invention.

Figure 2:
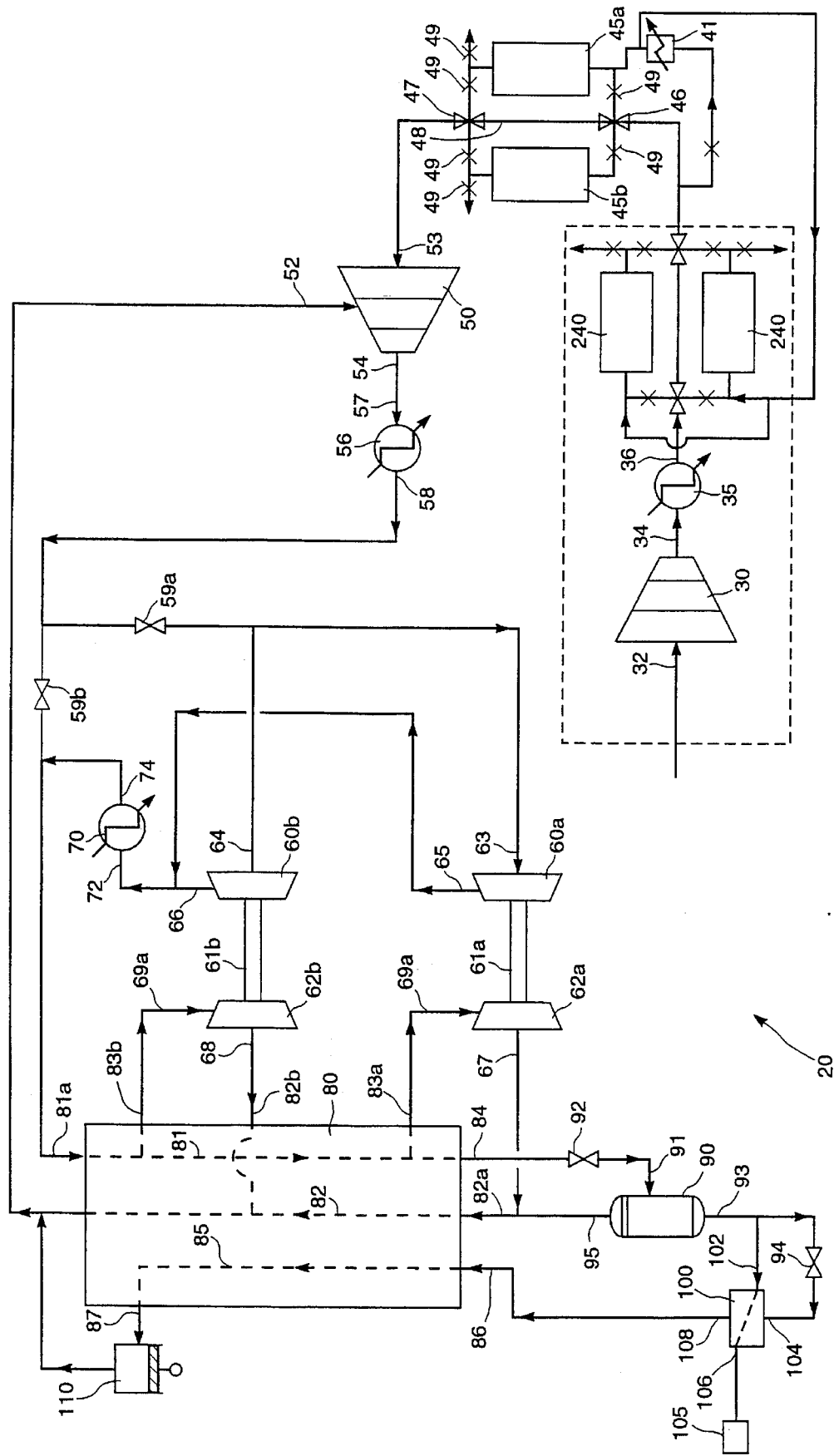
FIG. 2 is a simplified process flow schematic view of an alternative embodiment of the apparatus of the present invention.

An alternative embodiment of the apparatus 20 of the present invention is shown in FIG. 2. Where possible, the same reference numerals have been used in FIGS. 1 and 2 to notate like elements. The membrane separator 40 has been replaced by a pair of molecular sieve beds 240, connected in, parallel, fluid communication to the first aftercooler 35 to receive the compressed gaseous air mixture therefrom and to extract the portions of the oxygen, carbon dioxide and water vapour are extracted from the gaseous air mixture so as to produce a nitrogen-rich gaseous mixture comprising from about 90% to about 99% by volume of nitrogen, from about 10% to about 1% by volume of oxygen, and no more than trace amounts, as typically measured in parts per million (p.p.m.) of carbon dioxide, water vapour, and other elements and compounds.

Other modifications and alterations may be used in the design and manufacture of the apparatus of the present invention without departing from the spirit and scope of the accompanying claims.

What is claimed is:

1. A method of producing liquid nitrogen, comprising the steps of:
   using air comprising a gaseous mixture of about 78% by volume of nitrogen, about 21% by volume of oxygen, less than 1.0% by volume of argon, and small amounts of carbon dioxide, water vapour, and other trace elements and compounds;

extracting portions of the oxygen, carbon dioxide, and water vapour from said gaseous air mixture so as to produce a nitrogen-rich gaseous mixture comprising from about 90% to about 99% by volume of nitrogen, from about 10% to about 1% by volume of oxygen, and no more than trace amounts of carbon dioxide, water vapour, and other elements and compounds;

compressing said nitrogen-rich gaseous mixture to a first specified pressure above atmospheric pressure;

expanding the compressed nitrogen-rich gaseous mixture to a second lower specified pressure which is also above atmospheric pressure;

cooling the low pressure nitrogen-rich gaseous mixture until at least a portion of said nitrogen condenses to its liquid state;

separating the liquid nitrogen from the remaining nitrogen gas; and extracting the liquid nitrogen for subsequent storage or use.

2. The method of claim 1, further comprising the step of, before extracting portions of the oxygen, carbon dioxide, and water vapour from said gaseous air mixture, compressing said gaseous air mixture to a third specified pressure above atmospheric pressure, and wherein the step of extracting portions of the oxygen, carbon dioxide, and water vapour is performed by use of a membrane separator.

3. The method of claim 2, wherein the step of compressing said gaseous air mixture to a third specified pressure comprises compressing said gaseous air mixture to a pressure of from about 140 psig to about 190 psig.

4. The method of claim 1, further comprising the step of, before extracting portions of the oxygen, carbon dioxide, and water vapour from said gaseous air mixture, compressing said gaseous air mixture to a third specified pressure, and wherein the step of extracting portions of the oxygen is performed by use of a membrane separator.

5. The method of claim 4, wherein the step of compressing said gaseous air mixture to a third specified pressure comprises compressing said gaseous air mixture to a pressure of from about 140 psig to about 190 psig.

6. The method of claim 1, further comprising the step of, before extracting portions of the oxygen, carbon dioxide, and water vapour from said gaseous air mixture, compressing said gaseous air mixture to a third specified pressure, and wherein the step of extracting portions of the oxygen is performed by use of a molecular sieve bed separator.

7. The method of claim 6, wherein the step of compressing said gaseous air mixture to a third specified pressure comprises compressing said gaseous air mixture to a pressure of from about 140 psig to about 190 psig.

8. The method of claim 1, wherein the step of extracting portions of the carbon dioxide, and water vapour is performed by use of a molecular sieve bed.

9. The method of claim 8, wherein the step of extracting portions of the oxygen is performed by use of a molecular sieve bed.

10. The method of claim 1, wherein the step of compressing said nitrogen-rich gaseous mixture to a first specified pressure above atmospheric pressure comprises compressing said nitrogen-rich gaseous mixture to a pressure from about 140 psig to about 635 psig.

11. The method of claim 1, wherein the step of expanding the compressed nitrogen-rich gaseous mixture to a second lower specified pressure which is also above atmospheric pressure, comprises expanding said nitrogen-rich gaseous mixture to a pressure above 0 psig to below about 10 psig.

12. The method of claim 1, wherein the step of expanding the compressed nitrogen-rich gaseous mixture to said second lower pressure which is also above atmospheric pressure, comprises passing said compressed nitrogen-rich gaseous mixture through two expansion turbines.

13. The method of claim 1, wherein the step of cooling the low pressure nitrogen-rich gaseous mixture until at least a portion of said nitrogen condenses to its liquid state, comprises passing said compressed nitrogen-rich gaseous mixture through a heat exchanger.

14. The method of claim 1, further comprising, after the step of cooling the low pressure nitrogen-rich gaseous mixture until at least a portion of said nitrogen condenses to its liquid state and before the step of separating the liquid nitrogen from the liquefier for subsequent use, the step of:

as a substantial volume of condensed liquid nitrogen has been formed, sub-cooling the condensed liquid nitrogen to a temperature substantially below its boiling point.

15. An apparatus for producing liquid nitrogen from air comprising a gaseous mixture of about 78% by volume of nitrogen, about 21% by volume of oxygen, less than 1.0% by volume of argon, and small amounts of carbon dioxide, water vapour, and other trace elements and compounds, said apparatus comprising:

an extractor having an input of said gaseous air mixture, to extract portions of the oxygen, carbon dioxide, and water vapour therefrom so as to produce a nitrogen-rich gaseous mixture comprising about 90% to about 99% by volume of nitrogen, about 10% to about 1% by volume of oxygen, and no more than trace amounts of carbon dioxide, water vapour, and other elements and compounds;

a nitrogen compressor connected in fluid communication to said membrane separator to receive said nitrogen-rich gaseous mixture thereinto and compress said nitrogen-rich gaseous mixture to a first specified pressure above atmospheric pressure;

a gas expander connected in fluid communication to said nitrogen compressor to receive the compressed nitrogen-rich gaseous mixture therefrom and expand the compressed nitrogen-rich gaseous mixture to a second lower specified pressure which is also above atmospheric pressure;

a multiple-pass heat exchanger having a cooling pass connected in fluid communication to said gas expander to receive the cooled low pressure nitrogen-rich gaseous mixture therefrom, and a high pressure gaseous nitrogen pass connected in fluid communication to said nitrogen compressor, such that the nitrogen-rich gaseous mixture flowing in said cooling pass absorbs heat from said high pressure gaseous nitrogen pass so as to cool the high pressure nitrogen-rich gaseous mixture until at least a portion of said high pressure nitrogen-rich gaseous mixture condenses to liquid state;

a liquid/gas separator connected in fluid communication to said heat exchanger to receive liquid nitrogen and said nitrogen-rich gaseous mixture therefrom and separate said liquid nitrogen from said nitrogen-rich gaseous mixture; and an outlet connected in fluid communication to said liquid/gas separator to extract the liquid nitrogen from said apparatus for subsequent storage or use.

16. The apparatus of claim 15, wherein said extractor comprises an initial air compressor having an input of said gaseous air mixture and producing an output of a compressed gaseous air mixture at a third specified pressure, and a membrane separator connected in fluid communication to said air compressor to receive said compressed gaseous air mixture thereinto and extract portions of the oxygen, carbon dioxide, and water vapour therefrom so as to produce a nitrogen-rich gaseous mixture comprising about 90% to about 99% by volume of nitrogen, about 10% to about 1% by volume of oxygen, and no more than trace amounts of carbon dioxide, water vapour, and other elements and compounds.

17. The apparatus of claim 15, wherein said extractor comprises an initial air compressor having an input of said gaseous air mixture and producing an output of a compressed gaseous air mixture at a third specified pressure, and a molecular sieve connected in fluid communication to said air compressor to receive said compressed gaseous air mixture thereinto and extract portions of the oxygen, carbon dioxide, and water vapour therefrom so as to produce a nitrogen-rich gaseous mixture comprising about 90% to about 99% by volume of nitrogen, about 10% to about 1% by volume of oxygen, and no more than trace amounts of carbon dioxide, water vapour, and other elements and compounds.

18. The apparatus of claim 15, wherein said gas expander comprises a gas expansion turbine.

19. The apparatus of claim 15, further comprising a sub-cooler heat exchanger connected in fluid communication between said liquid/gas separator and said outlet, to receive the condensed liquid nitrogen from said liquid/gas separator and sub-cool the condensed liquid nitrogen to a temperature substantially below its boiling point.

20. The apparatus of claim 15, further comprising a nitrogen booster compressor connected in fluid communication between said heat exchanger and said nitrogen recycle compressor.

\* \* \* \* \*